June 19, 1934. H. A. CLARK 1,963,936
OIL SEAL
Filed Nov. 2, 1931 2 Sheets-Sheet 1
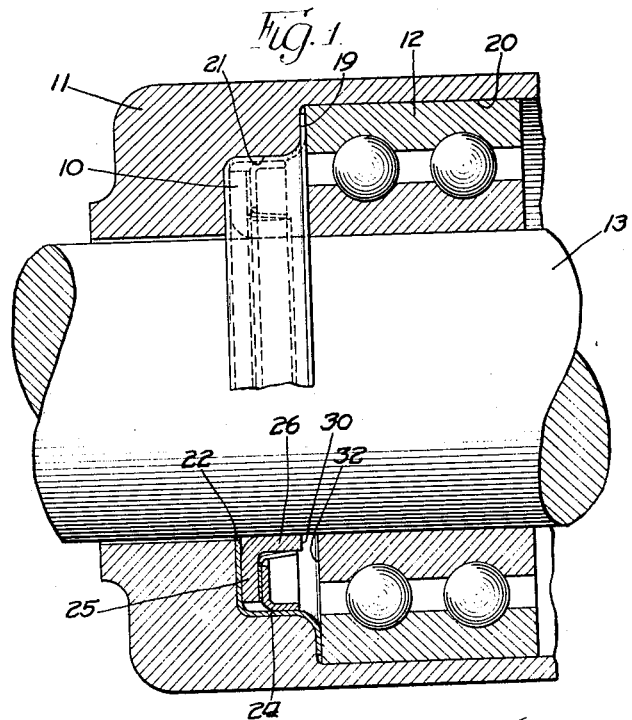
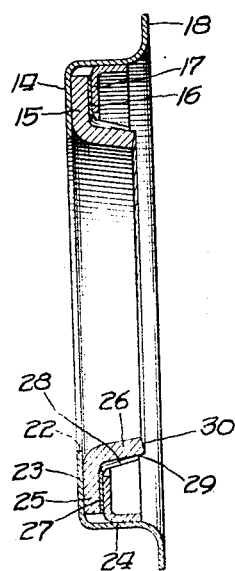
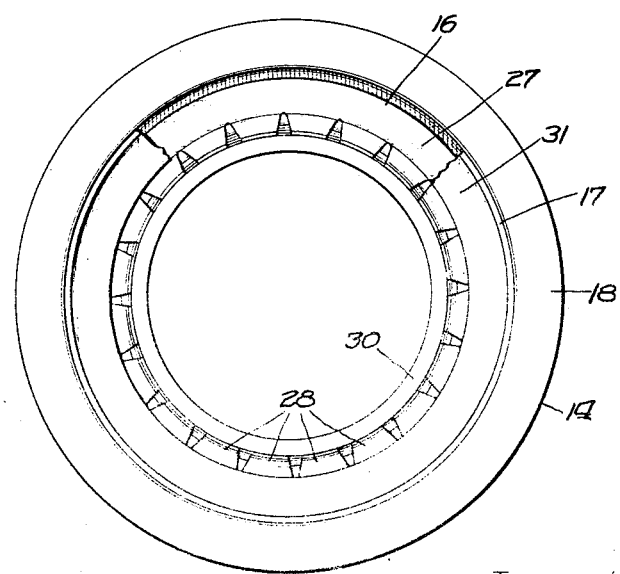
Inventor:
Harold A. Clark.

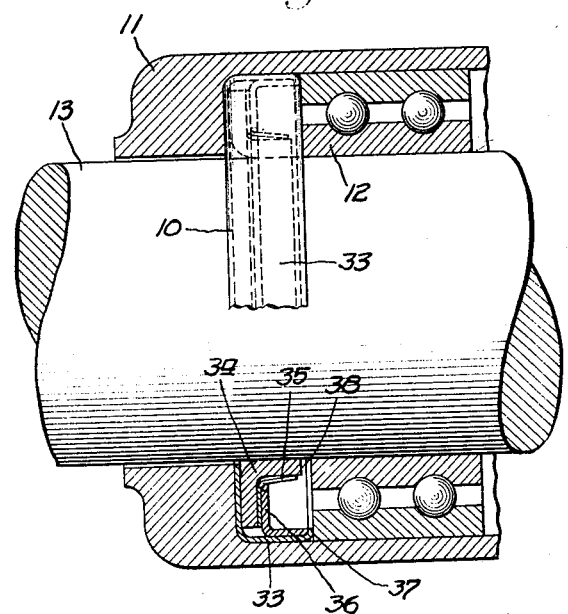
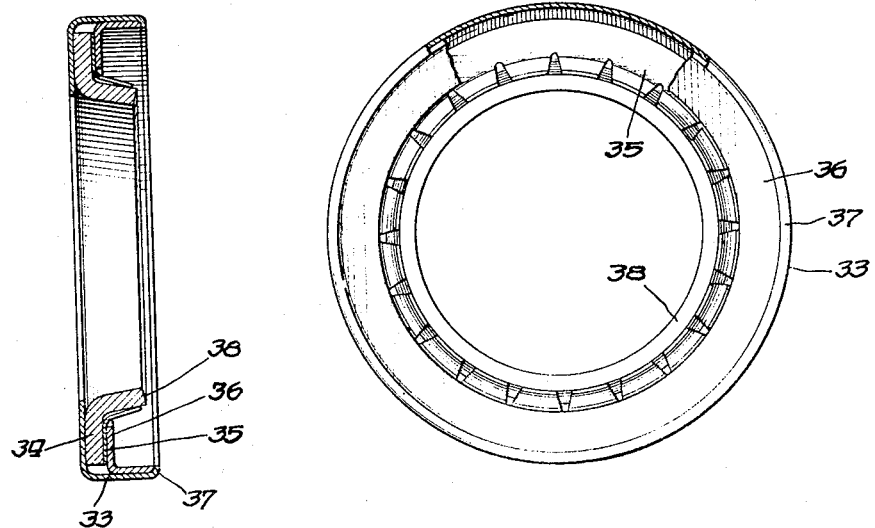

Patented June 19, 1934

1,963,936

UNITED STATES PATENT OFFICE 1,963,936

OIL SEAL

Harold A. Clark, Northbrook, Ill., assignor to The Chicago Rawhide Manufacturing Company, Chicago, Ill., a corporation of Illinois Application November 2, 1931, Serial No. 572,524

3 Claims. (Cl. 288—1)

The present invention is concerned with oil seals of the type used in oil-filled housings about moving shafts for the purpose of retaining the oil in the housings and preventing it from leaking out along the shafts.

The principal object of the invention is to provide a self-contained oil seal unit of the type described which will drain freely without trapping any of the oil or any of the flushing liquid used when changing the oil; which will prevent the axially projecting edge of the sealing leather from coming into contact with the associated bearing; which is exceedingly simple, strong and compact in construction; and which will give an efficient sealing action.

Other more specific objects and advantages of the invention will be evident upon a full understanding of the construction, arrangement and function of the parts combined to produce the improved seal.

Two slightly different structural embodiments of the invention are presented herein by way of exemplification, but it will of course be appreciated that the invention may be incorporated in other forms coming equally within the contemplated scope of the appended claims.

In the accompanying drawings:

Fig. 1 is a diametric section through a housing equipped with the seal of the invention, showing the seal partly in section and partly in side elevation;

Fig. 2 is a diametric section through the seal before installation in the housing;

Fig. 3 is a partially broken away rear end view of the seal; and

Figs. 4, 5 and 6 are views which correspond generally to Figs. 1, 2 and 3 but which show a slightly modified embodiment of the invention.

The embodiment illustrated in Figs. 1 to 3 inclusive will first be described. In Fig. 1, it will be observed that the seal 10 is positioned in a housing 11, adjacent a bearing 12, in encompassing relation to a shaft 13. The seal includes a centrally apertured sheet metal cup 14, a flanged sheet leather packing element 15, a flanged sheet metal multiple-finger spring 16, and a second centrally apertured sheet metal cup 17.

The cup 14 encloses all the other parts, and is preferably provided with a radially extending flange 18 on its rim for abutment with an annular shoulder 19 in the housing. The flange 18 may be employed to advantage in those installations where the cylindrical portion 20 of the bore of the housing in which the bearing 12 is located is of greater diameter than the adjoining portion 21 in which the seal is located. The aperture 22 in the bottom 23 of the cup 14 is somewhat larger than the shaft 13 in order to prevent the cup from contacting with the shaft. The portion 24 of the cup 14 is cylindrical and fits snugly within the portion 21 of the bore of the housing in pressed-fit fluid-tight engagement with the same.

The leather packing element 15 is flexible and is characterized by a flat radially extending portion 25 and a cone-shaped axially extending portion 26. When the seal is applied to the shaft 13, the latter will distend the cone-shaped portion 26 to a certain extent, causing it to assume the more nearly cylindrical form shown in Fig. 1. The packing 15 is positioned in the cup 14 with the flat portion 25 of the former in contiguous fluid-tight engagement with the flat bottom portion 23 of the latter. The packing is of approximately the same diameter as the inside of the cylindrical portion 24 of the cup, but may be somewhat smaller if desired.

The multiple-finger spring 16 is similar in shape to the packing 15. It has a flat radially extending portion 27 which fits tightly against the radially extending portion 25 of the packing, and it has a cone-shaped axially extending portion in the form of a plurality of spring fingers 28. The fingers 28 surround the axially extending portion 26 of the packing and verge gradually into substantial line contact therewith at 29. These fingers exert at all times a resilient constricting action on the packing close to the edge 30 of the latter and combine with the packing to produce a very effective seal for the shaft at that point.

The inner cup 17 is fixedly positioned with a pressed fit in the cylindrical portion 24 of the outer cup, and is provided with a flat centrally apertured bottom 31 which bears against the flat portion 27 of the spring and clamps the packing and spring together under pressure against the bottom portion 23 of the outer cup.

The above described assemblage of parts is permanent in character and constitutes a complete self-contained sealing unit which is entirely separate from and independent of the bearing organization with which it is adapted to be associated.

The improved seal is entirely open at the oil-opposing face thereof—which is ordinarily the face toward which the edge 30 of the packing projects. This permits the seal to drain out completely when the oil is removed and prevents any trapping of the oil or the flushing liquid by the structure of the cage of the seal. The edge 30 of the leather packing is protected from injury by contact with the bearing by reason of the projection of the rim of the outer cup 14 to a point beyond the edge 30, thereby leaving a little clearance between such edge and the adjacent face 32 of the bearing.

The modification shown in Figs. 4, 5 and 6 differs in one respect only from the form shown in Figs. 1, 2 and 3.

It will be observed that the modified form, like the first form, includes an outer cup 33, a leather packing 34, a multiple-finger spring 35 and an inner cup 36. The rim of the outer cup 33, instead of being turned outwardly, however, is turned inwardly in a narrow inwardly spun flange 37 which abuts against the edge of the rim on the inner cup 36 and holds the latter tightly clamped against the spring and packing. Because of this interlock, a pressed fit between the inner cup and the outer cup is not absolutely necessary. In this form, as in the other, the oil-opposing face of the seal is entirely open and the axially projecting edge 38 of the packing terminates short of the plane defined by the inturned flange 37 on the outer cup.

I claim:

1. A self-contained seal for insertion as an assembled unit within a tubular housing in encompassing relation to a centrally located shaft, consisting of a flat centrally apertured sheet metal cup, an annular packing member having a flat radially extending portion and an axially extending portion, which packing member is positioned in the cup with the radially extending portion in extended surface contact with the bottom of the cup and with the axially extending portion projecting in the same direction as the rim of the cup, a flat ring positioned in the cup against the radially extending portion of the packing in opposition to the bottom of the cup and provided with a plurality of converging spring fingers which contact with the axially extending portion of the packing adjacent the free edge of the latter, and a second centrally apertured sheet metal cup of slightly less diameter and depth than the first cup nested within the latter with the bottom of the second cup in engagement with said ring.

2. A self-contained seal for insertion as an assembled unit within a tubular housing in encompassing relation to a centrally located shaft, consisting of a flat centrally apertured sheet metal cup, an annular packing member having a flat radially extending portion and an axially extending portion, which packing member is positioned in the cup with the radially extending portion in extended surface contact with the bottom of the cup and with the axially extending portion projecting in the same direction as the rim of the cup, a flat ring positioned in the cup against the radially extending portion of the packing in opposition to the bottom of the cup and provided with a plurality of converging spring fingers which contact with the axially extending portion of the packing adjacent the free edge of the latter, and a second centrally apertured sheet metal cup of slightly less diameter and depth than the first cup nested within the latter with the bottom of the second cup in engagement with said ring, said outer cup being provided on its rim with an inturned flange in abutment with the rim of the inner cup.

3. A self-contained seal, comprising two centrally apertured generally cup-shaped sheet metal stampings, one of which is nested within the other, with the rims of both stampings pointing in the same direction, a centrally apertured packing having a radially extending portion which is clamped between the bottoms of the two cup-shaped stampings and having an axially extending portion which projects in the same direction as the rims of the stampings, and spring means positioned about the axially extending portion of the packing for resiliently constricting the latter on a shaft, said spring means being retained in position by the inner stamping.

HAROLD A. CLARK.